United States Patent
Kim et al.

(10) Patent No.: US 9,524,054 B2
(45) Date of Patent: Dec. 20, 2016

(54) INTEGRATOR AND TOUCH SENSING SYSTEM USING THE SAME

(71) Applicant: LG Display Co., Ltd., Seoul (KR)

(72) Inventors: Beomjin Kim, Seoul (KR); Dukhyo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/946,676

(22) Filed: Nov. 19, 2015

(65) Prior Publication Data

US 2016/0147368 A1    May 26, 2016

(30) Foreign Application Priority Data

Nov. 21, 2014   (KR) .................. 10-2014-0163414

(51) Int. Cl.
G06F 3/045 (2006.01)
G06F 3/041 (2006.01)
G09G 3/36 (2006.01)
G06F 3/044 (2006.01)

(52) U.S. Cl.
CPC ............ *G06F 3/0416* (2013.01); *G06F 3/044* (2013.01); *G06F 3/0412* (2013.01); *G09G 3/3696* (2013.01)

(58) Field of Classification Search
CPC .................................................. G06F 3/0416
USPC ....................................................... 345/174
See application file for complete search history.

(56) References Cited

U.S. PATENT DOCUMENTS

| 2011/0187390 A1* | 8/2011 | Lin | G01R 27/2605 324/679 |
|---|---|---|---|
| 2011/0242048 A1 | 10/2011 | Guedon et al. | |
| 2011/0279407 A1 | 11/2011 | Kim et al. | |
| 2011/0310051 A1 | 12/2011 | Souchkov | |
| 2013/0222335 A1 | 8/2013 | Lee et al. | |
| 2013/0249825 A1 | 9/2013 | Kang et al. | |
| 2014/0204053 A1 | 7/2014 | Crandall | |
| 2015/0261341 A1* | 9/2015 | Weinerth | G06F 3/0416 345/174 |

FOREIGN PATENT DOCUMENTS

WO  WO 2012/034714 A1  3/2012
WO  WO 2013/062128 A1  5/2013

OTHER PUBLICATIONS

European Extended Search Report, European Application No. 15195526.7, May 3, 2016, 9 pages.

* cited by examiner

*Primary Examiner* — Jason Olson
(74) *Attorney, Agent, or Firm* — Fenwick & West LLP (57) ABSTRACT

A touch sense circuit comprises a first sampling circuit to sample a touch sense signal during a first period of a touch drive signal in which the touch drive signal is at a first level, to generate a first sampled signal; a second sampling circuit to sample the touch sense signal during a second period of the touch drive signal in which the touch drive signal is at a second level, to generate a second sampled signal, the second sampled signal in a same polarity as the first sampled signal; and an integrator including an input terminal and an output terminal, both the first sampled signal and the second sampled signal being input to the input terminal of the integrator and integrated to generate an output signal at the output terminal of the integrator, the output signal being used to detect a touch input.

30 Claims, 9 Drawing Sheets

FIG. 1

(RELATED ART)

FIG. 2

(RELATED ART)

FIG. 3

(RELATED ART)

INTEGRATOR AND TOUCH SENSING SYSTEM USING THE SAME

CROSS-REFERENCE TO RELATED APPLICATION

This patent application claims priority under 35 U.S.C. §119(a) from Republic of Korea patent application no. 10-2014-0163414 filed on Nov. 21, 2014, which is incorporated by reference herein in its entirety.

BACKGROUND

1. Field

The present disclosure relates to an integrator, a touch sensing system using the same, and a display device coupled with the touch sensing system.

2. Related Art

User interfaces (UI) enable humans (users) to interact with various types of electric or electronic devices so that they can easily control the devices as they want. Typical examples of the user interfaces include keypads, keyboards, mice, on-screen displays (OSD), and remote controllers with an infrared communication capability or radio frequency (RF) communication capability. The user interface technology is continuing to make progress toward higher user sensitivity and ease of operation. Recently, user interfaces have been evolving into touch UI, voice recognition UI, 3D UI, etc.

Capacitive touchscreens can be implemented as capacitance sensors. The capacitance sensors may be classified into self-capacitance sensors and mutual capacitance sensors.

Figure 1:
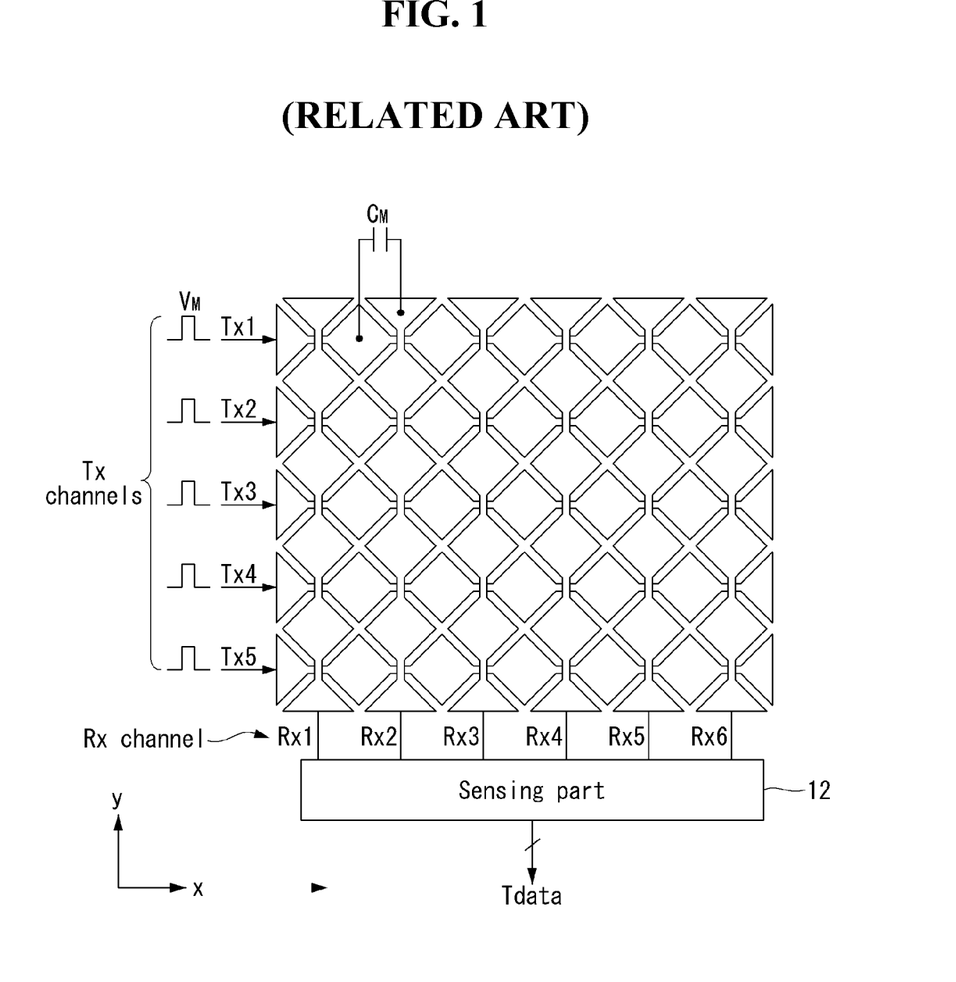
FIG. 1 is a view showing a mutual capacitance touchscreen.

As shown in FIG. 1, a mutual capacitance sensor includes mutual capacitance CM formed between two electrodes Tx and Rx. A sensing part 12 applies a driving signal (or stimulus signal) to Tx lines Tx1 to Tx5, and senses touch input based on a change in the amount of charge in the mutual capacitance before and after a touch on Rx lines Rx1 to Rx6. The change in the amount of charge in the mutual capacitance CM refers to the difference in the amount of charge before and after touch input. The mutual capacitance CM decreases when a conductive object is brought closer to it. The sensing part 12 converts the change in the amount of charge to digital data (hereinafter, referred to as 'touch raw data') by an analog-to-digital converter (hereinafter, referred to as 'ADC') and outputs it.

Figure 2:
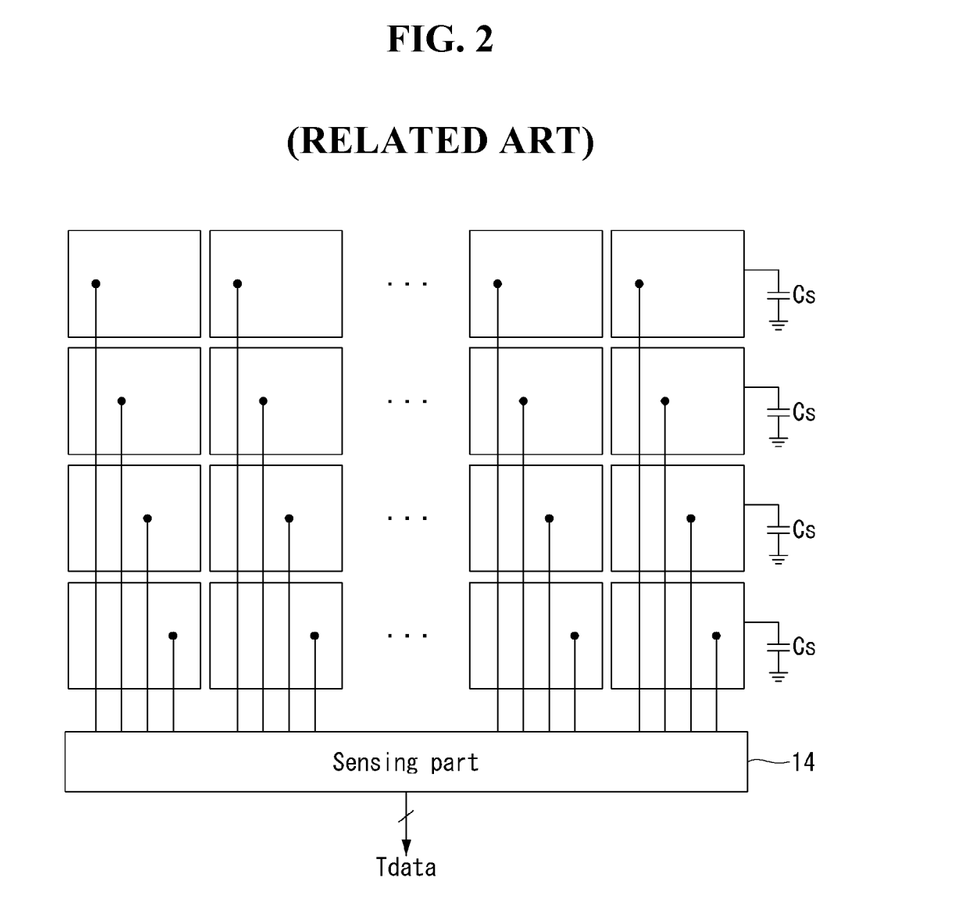
FIG. 2 is a view showing a self-capacitance touchscreen.

As shown in FIG. 2, a self-capacitance sensor includes self-capacitance Cs formed in each sensor electrode. A sensing part 14 supplies charge to each sensor electrode and senses touch input based on a change in the amount of charge in the self-capacitance Cs. The self-capacitance Cs increases when a conductive object is brought closer to it. The sensing part 14 converts the change in the amount of charge to touch raw data by an ADC and outputs it.

The sensing parts 12 and 14 sample a change in the amount of charge received from touch sensors as a voltage by using a charge amplifier and an integrator. The output voltage of the integrator is input into the analog-to-digital converter (hereinafter, referred to as 'ADC') and converted to digital data (hereinafter, referred to as 'touch raw data').

The charge amplifier outputs a change in the amount of charge as a voltage in the rising period of a driving signal applied to the touch sensors. The integrator amplifies the difference between the output voltage of the charge amplifier and a reference voltage of the integrator at the ratio of $\alpha = Cs/CFBI$. Herein, Cs is the capacitance of a sampling capacitor, and CFBI is the capacitance of a feedback capacitor of the integrator. Then, the integrator accumulates the sampled voltage in the capacitor CFBI and integrates it.

The conventional integrator has the following problems.

Figure 3:
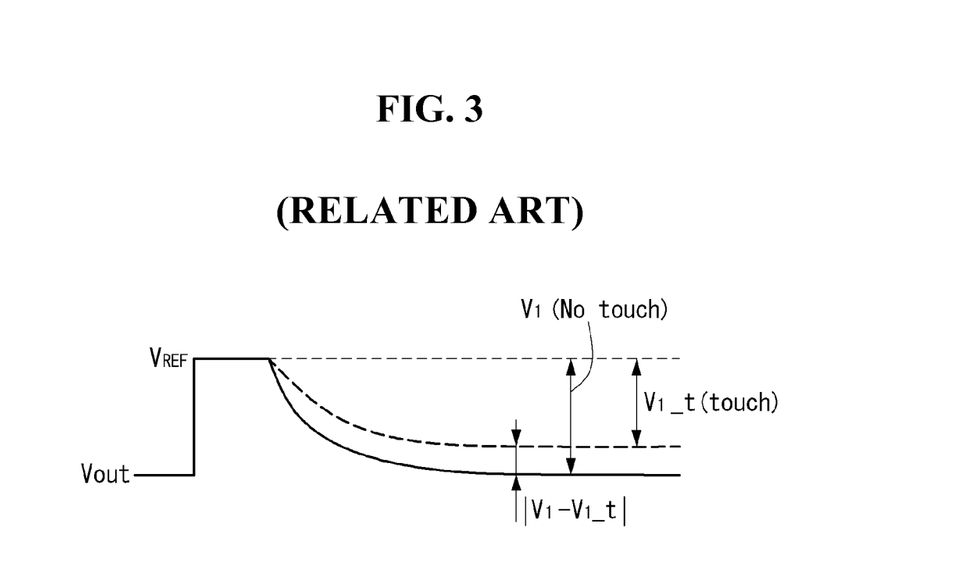
FIG. 3 is a waveform diagram showing an output voltage of a charge amplifier.

First, the number of integrations is limited because the voltage of the charge amplifier, which is integrated by the integrator, is higher than necessary. In an example shown in FIG. 3, a touch can be detected based only on the difference $|V1-V1\_t|$ between a non-touch voltage V1 and a touch voltage V1_t; however, the integrator integrates a voltage higher than necessary since the output voltage Vout of the charge amplifier is higher than the voltage difference $|V1-V1\_t|$. The output voltage Vout of the charge amplifier is V1 when there is no touch, and V1_t when there is touch input. In FIG. 3, Vref is the reference voltage of the charge amplifier.

Second, the integrator has a larger circuit area when it is made capable of double sampling. The integrator may be implemented as a single-ended amplifier or a differential amplifier. The integrator may be implemented as a differential type Then, the integrator accumulates the sampled voltage in a capacitor CFBI and integrates it. integrator capable of double sampling. This differential type integrator requires more than twice as many integrators and switches as the single-ended integrator.

Third, the output voltage range of the integrator is narrow. The output voltage of the integrator ranges from 0 to VDD/2, where VDD is the supply voltage of the integrator, because the reference voltage of the integrator is VDD/2.

SUMMARY

An aspect of this document is to provide an integrator which allows for a wider output voltage range, an increased number of integrations, and a reduction in the circuit area needed for a double-sampling integrator circuit, a touch sense circuit using the same, and a display device coupled with the touch sensing system, and a method of detecting touch input using such touch sense circuit.

In one embodiment, a touch sense circuit comprises a first sampling circuit to sample a touch sense signal during a first period of a touch drive signal in which the touch drive signal is at a first level, to generate a first sampled signal; a second sampling circuit to sample the touch sense signal during a second period of the touch drive signal in which the touch drive signal is at a second level, to generate a second sampled signal, the second sampling circuit configured to generate the second sampled signal in a same polarity as the first sampled signal; and an integrator including an input terminal and an output terminal, both the first sampled signal and the second sampled signal being input to the input terminal of the integrator and integrated to generate an output signal at the output terminal of the integrator, the output signal being used to detect a touch input.

In some embodiments, the first sampled signal may be indicative of a first difference between the touch sense signal and a first reference voltage, and the second sampled signal may be indicative of a second difference between the touch sense signal and a second reference voltage. In some embodiments, the first reference voltage and the second reference voltage are set to a value of the touch sense signal during the first period and the second period, respectively, of the touch drive signal when there is no touch.

In some embodiments, the touch sense signal is indicative of change in mutual capacitance of the touch electrodes responsive to the touch input. The touch sense circuit may further comprise a charge amplifier circuit to amplify a difference between a voltage at the mutual capacitance and a mutual touch reference voltage to generate the touch sense signal.

In other embodiments, the touch sense signal is indicative of change in self-capacitance of the touch electrodes responsive to the touch input. The touch sense circuit may further comprise a charge amplifier circuit to amplify a difference between a voltage at the self-capacitance and the touch drive signal to generate the touch sense signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

A display device according to embodiments herein may be implemented as a flat panel display such as a liquid crystal display (LCD), a field emission display (FED), a plasma display panel (PDP), an organic light emitting display (OLED), or an electrophoresis display (EPD). Although the following exemplary embodiments will be described with respect to a liquid crystal display as an example of the flat plane display, it is to be noted that the display device of this invention is not limited to the liquid crystal display.

Hereinafter, exemplary embodiments of the present invention will be described in detail with reference to the accompanying drawings. Like reference numerals refer to like elements throughout the specification. In the following description, detailed descriptions of well-known functions or configurations will be omitted where they may unnecessarily obscure the subject matters of the invention.

Figure 4:
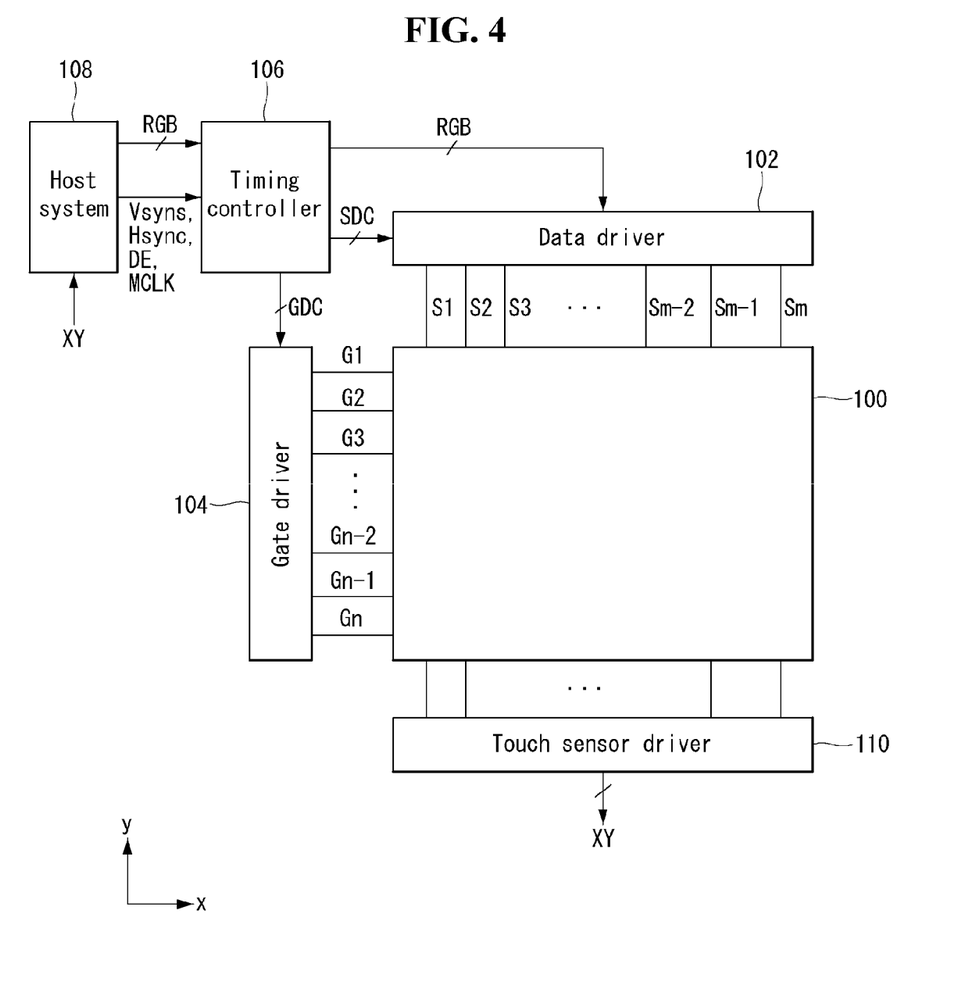
FIG. 4 is a view showing a touch sensing system according to an embodiment.
Figure 5:
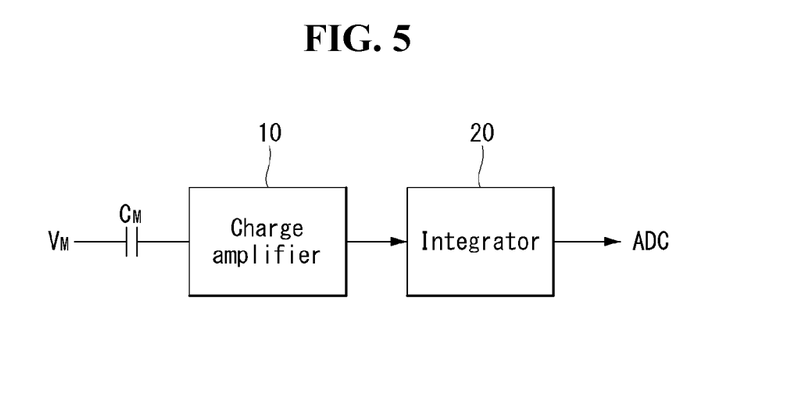
FIG. 5 is a view showing the configuration of an analog circuit for the touch sensor driver 110 of FIG. 4 according to an embodiment.

FIG. 4 is a view showing a touch sensing system according to the present invention. FIG. 5 is a view showing the configuration of an analog circuit for the touch sensor driver 110 of FIG. 4.

Referring to FIGS. 4 and 5, a display device of this invention includes a touchscreen coupled with a display panel 100.

The touchscreen includes capacitive touch sensors. The mutual capacitance or self-capacitance of the touch sensors changes.

The display device of this invention includes display drive circuits 102, 104, and 106 for writing input image data to a pixel array, and a touch sensor driver 110 for sensing touch input based on a change in the amount of charge in the touch sensors before and after a touch.

In the case of a liquid crystal display, a liquid crystal layer is formed between substrates of the display panel 100. Liquid crystal molecules are driven by an electric field generated due to a potential difference between a data voltage applied to a pixel electrode and a common voltage Vcom applied to a common electrode. Each pixel includes a TFT (thin film transistor) formed at the crossings of the data lines S1 to Sm and the gate lines G1 to Gn, a pixel electrode that receives a data voltage through the TFT, a common electrode divided into touch sensor electrodes, and a storage capacitor Cst connected to the pixel electrode and for maintaining the voltage of a liquid crystal cell.

Each touch sensor includes mutual capacitance CM or self-capacitance Cs. The electrodes of the touch sensors may be embedded in the pixel array by an in-cell process. If the touch sensors are embedded in the pixel array of the display panel 100, the pixel array of the display panel 100 includes pixels defined by data lines S1 to Sm (m is a positive integer) and gate lines G1 to Gn (n is a positive integer), the touch sensors divided up from the common electrode, and sensor lines connected to the touch sensors. The common electrode may be divided into electrode patterns for the touch sensors.

On the upper substrate of the display panel 100, a black matrix, color filters, etc. may be formed. The lower substrate of the display panel 100 may be implemented in a COT (color filter on TFT) structure. In this case, the color filters may be formed on the lower substrate of the display panel 100. Polarizers are respectively attached to the upper and lower substrates of the display panel 100, and an alignment film for setting a pre-tilt angle of liquid crystals is formed on an inner surface contacting the liquid crystals. A column spacer for maintaining a cell gap of the liquid crystal layer is formed between the upper and lower substrates of the display panel 100.

In the case of a liquid crystal display, a backlight unit may be disposed under the back of the display panel 100. The backlight unit is an edge-type or direct-type backlight unit which illuminates the display panel 100. The display panel 100 may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A self-luminous display device such as an organic light emitting diode display requires no backlight unit.

The display drive circuits 102, 104, and 106 include a data driver 102, a gate driver 104, and a timing controller 106.

The data driver 102 converts digital video data RGB of an input image received from the timing controller 106 to an analog positive/negative gamma compensation voltage to output a data voltage. The data voltage output from the data driver 102 is supplied to the data lines S1 to Sm.

The gate driver 104 sequentially supplies a gate pulse (or scan pulse) synchronized with the data voltage to the gate lines G1 to Gn and selects lines of the display panel 100 to which the data voltage is written. The gate pulse swings between a gate high voltage VGH and a gate low voltage VGL. The gate pulse is applied to the gates of the pixel TFTs through the gate lines G1 to Gn. The gate high voltage VGH is set to a voltage higher than a threshold voltage of the pixel TFTs and turns on the pixel TFTs. The gate low voltage VGL is a voltage lower than the threshold voltage of the pixel TFTs.

The timing controller 106 receives timing signals, such as a vertical synchronization signal Vsync, a horizontal synchronization signal Hsync, a data enable signal DE, and a main clock MCLK, from a host system 108, and synchronizes the operation timings of the data driver 102, gate driver 104, and touch sensor driver 110. In FIG. 4, SDC is a data timing signal for controlling the operation timing of the data driver 102, and GDC is a gate timing signal for controlling the operation timing of the gate driver 104.

The host system 108 may be implemented as any one of the following: a television system, a set-top box, a navigation system, a DVD player, a Blue-ray player, a personal computer PC, a home theater system, and a phone system. The host system 108 comprises a system-on-chip (SoC) having a scaler incorporated therein, and converts digital video data of an input image into a format suitable for the resolution of the display panel 100. The host system 108 transmits the timing signals Vsync, Hsync, DE, and MCLK, along with the digital video data RGB of the input image, to the timing controller 106. Further, the host system 108 executes an application associated with coordinate information XY of touch input from the touch sensor driver 110.

The touch sensor driver 110 supplies charge to the touch sensors using the sensing part, and detects a change in the amount of charge in the touch sensors before and after a touch and generates touch raw data. The touch sensor driver 110 executes a touch sensing algorithm using an operation logic circuit. In the touch sensing algorithm, touch raw data is compared with a preset threshold to detect touch input, and an identification code and coordinate information XY are added to each touch input and transmitted to the host system 108.

In the touch sensor driver 110, an analog circuit for the sensing part includes a charge amplifier 10 and an integrator 20, as shown in FIG. 5. The analog circuit samples a change in the amount of charge received from the touch sensors as a voltage.

Figure 7:
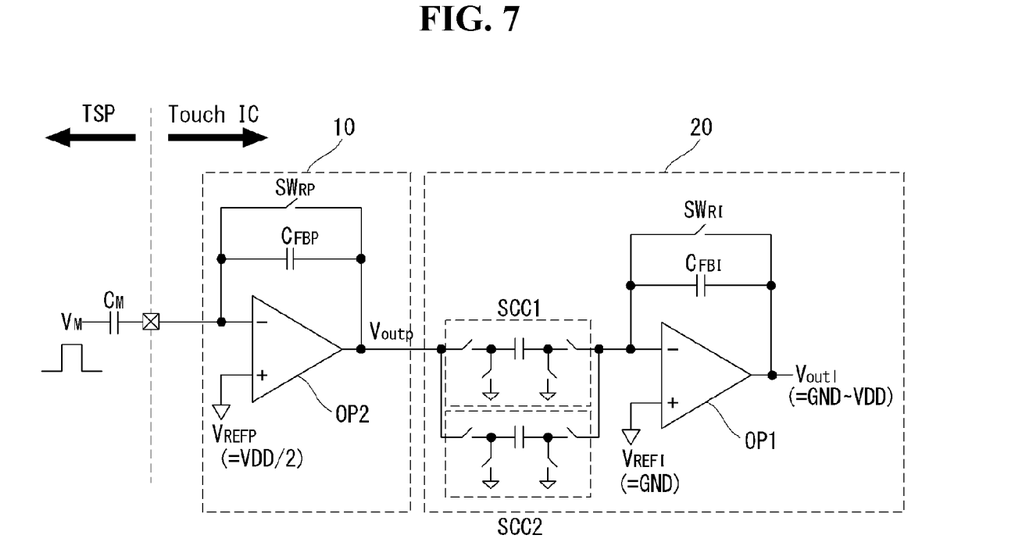
FIG. 7 is a circuit diagram showing an example of application of the integrator of this invention in an analog circuit for the sensing part of FIG. 1.
Figure 9:
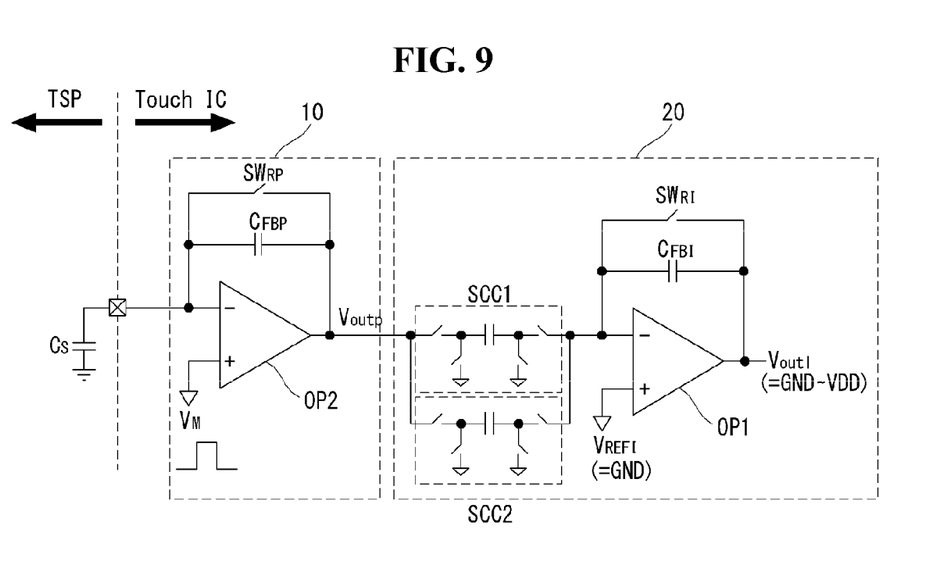
FIG. 9 is a circuit diagram showing an example of application of the integrator according to an embodiment in an analog circuit for the sensing part of FIG. 2.

The charge amplifier 10 outputs a change in the amount of charge as a voltage in the rising period of a touch driving signal VM. In the case of the mutual capacitance CM, the driving signal VM is applied directly to the Tx electrodes, as shown in FIG. 7. On the other hand, in the case of the self-capacitance Cs, the driving signal VM is applied to a reference voltage terminal of the charge amplifier 10, as shown in FIG. 9.

The integrator 20 accumulates the output voltage of the charge amplifier by DI (delta integration) and DS (double sampling). The DI is a technique of integrating only the difference between touch data and non-touch data. The DS is a technique of sampling the output voltage of the integrator in the rising and falling periods of a touch driving signal applied to the touch sensors, with both sampled output voltages at the rising and falling periods of the touch driving signal contributing in the same polarity, i.e., in the same direction. The integrator 20 of this invention implements the DS using a single-ended amplifier OP1 shown in FIG. 6, so as to avoid an increase in circuit area due to the DS.

Figure 6:
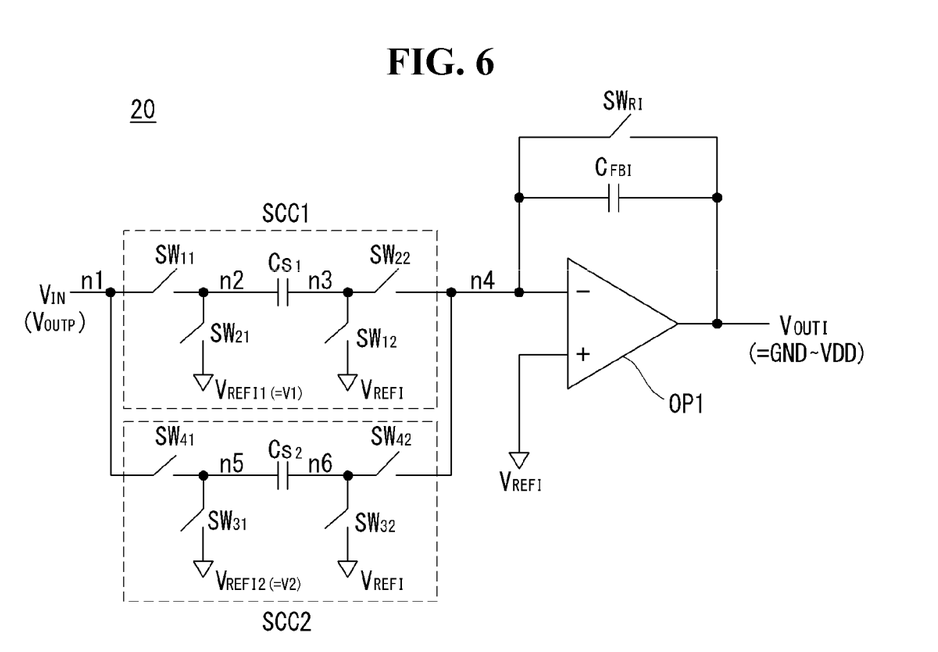
FIG. 6 is a circuit diagram showing in detail an integrator according to according to an embodiment.

FIG. 6 is a circuit diagram showing in detail the integrator 20 according to an exemplary embodiment of the present invention.

Referring to FIG. 6, the integrator 20 includes a first sampling circuit SCC1, a second sampling circuit SCC2, an integrating capacitor CFBI, a single-ended amplifier OP1, etc.

When an output terminal of the charge amplifier 10 is connected to an input terminal of the integrator 20, an input voltage VIN is the output voltage VOUTP of the charge amplifier 10. The input reference voltage $V_{REFI}$ of the integrator 20 may be set from 0 (GND) to VDD. VDD is a positive power supply voltage. Accordingly, the output voltage VOUT1 of the integrator 20 has a wider output voltage range, i.e., from 0 (GND) to VDD, than in the conventional art.

The first and second sampling circuits SCC1 and SCC2 are connected to an inverting terminal of the single-ended amplifier OP1. A reset switch $SW_{RI}$ and a feedback capacitor $C_{FBI}$ are connected between the inverting input terminal of the single-ended amplifier OP1 and an output terminal, $V_{OUT1}$. The reference voltage $V_{REFI}$ is supplied to a non-inverting input terminal of the single-ended amplifier OP1.

As shown in FIG. 6, the input reference voltages ($V_{REFI1}$=V1, $V_{REFI2}$=V2) of the first and second sampling circuits SSC1 and SSC2 are set to be the same as the output voltage VOUTP of the charge amplifier occurring when there is no touch. Accordingly, the integrator 20 integrates only the difference between touch voltages V1_t and V2_t and non-touch voltages V1 and V2, respectively, when there is touch input and touch voltages V1_t and V2_t are input to VIN. As a consequence, the number of integrations of the integrator 20 may be increased without an increase in the capacitance of the integrating capacitor CFBI.

The first sampling circuit SCC1 samples an input voltage VIN in the rising period of a touch driving signal VM. The first sampling circuit SCC1 includes a 1a switch SW11, a 1b switch SW12, a 2a switch SW21, a 2b switch SW22, and a first sampling capacitor CS1. The first sampling capacitor CS1 is connected between a second node n2 and a third node n3.

Figure 8:
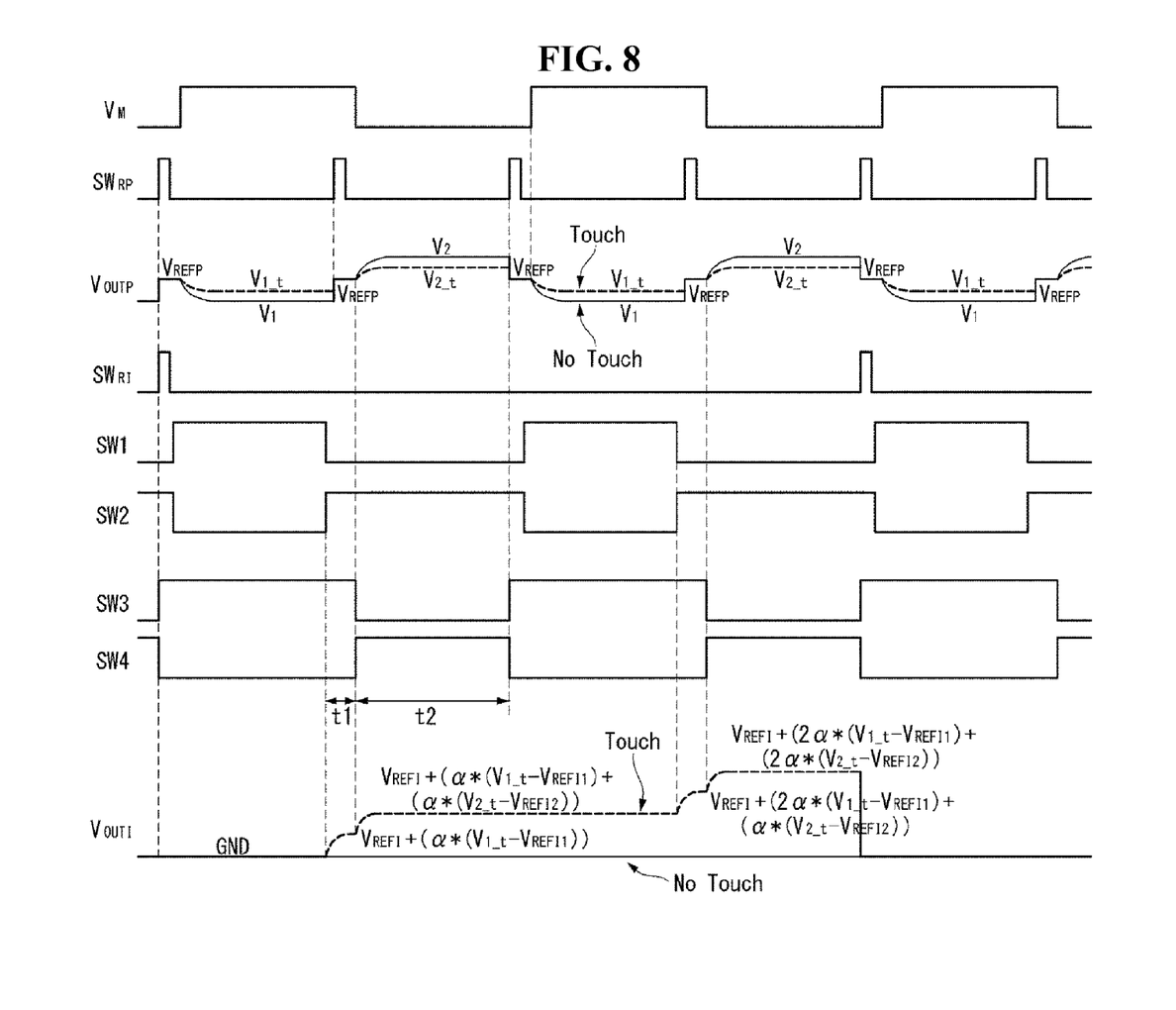
FIG. 8 is a waveform diagram showing input and output waveforms of the analog circuit of FIG. 7.

The 1a switch SW11 is connected between a first node n1 and the second node n2. The first node n1 is connected to an input terminal VIN of the integrator 20. The second node n2 is connected to the 1a switch SW11, a first electrode of the first sampling capacitor CS1, and the 2a switch SW21. The 1b switch SW12 is connected between the third node n3 and a second input reference voltage terminal. The third node n3 is connected to a second electrode of the first sampling capacitor CS1, the 1b switch SW12, and the 2b switch SW22. The reference voltage VREFI, which is the same as the reference voltage of the single-ended amplifier OP1, is supplied to the second input reference voltage terminal. As shown in FIG. 8, the 1a and 1b switches SW11 and SW12 are simultaneously turned on before the rising period of the touch driving signal VM, to store the input voltage VIN in the first sampling capacitor CS1 and sample the input voltage VIN.

The 2a switch SW21 is connected between the second node n2 and a first input reference voltage terminal. A first input reference voltage VREFI1=V1 is supplied to the first input reference voltage terminal. The first input reference voltage VREFI1=V1 is set as the output voltage of the charge amplifier 10 occurring in the rising period of the driving signal VM when there is no touch. The 2b switch SW22 is connected between the third node n3 and the fourth node n4. The fourth node n4 is connected to the 2b switch SW22, a fourth switch SW42, the inverting input terminal (−) of the single-ended amplifier OP1, the feedback capacitor CFBI, and an integrator reset switch SWRI. The 2a and 2b switches SW21 and SW22 are turned on in the rising period of the touch driving signal VM after the turn-off of the 1a and 1b switches SW11 and SW12. The 2a and 2b switches SW21 and SW22 supply the input voltage VIN to the feedback capacitor CFBI of the single-ended amplifier OP1 in the rising period of the driving signal VM.

The voltage sampled in the rising period of the touch driving signal VM is VIN(=VOUTP)−VREFI1. If the output voltage VOUTP of the charge amplifier 10 occurring when there is no touch is V1 and VREFI1 is set to V1, VOUTP−VREFI1=V1−V1=0. If there is a touch, VOUTP is different from VREFI1 and that difference will be sampled at the rising period of the touch driving signal VM.

The second sampling circuit SCC2 samples the input voltage VIN in the falling period of the touch driving signal VM. The second sampling circuit SCC2 includes a 3a switch SW31, a 3b switch SW32, a 4a switch SW41, a 4b switch SW42, and a second sampling capacitor CS2. The second sampling capacitor CS2 is connected between a fifth node n5 and a sixth node n6.

The 3a switch SW31 is connected between the fifth node n5 and a third input reference voltage terminal. A third input reference voltage VREFI2=V2 is supplied to the third input reference voltage terminal. The third input reference voltage VREFI2=V2 is set as the output voltage of the charge amplifier 10 occurring in the falling period of the touch driving signal VM when there is no touch. The fifth node n5 is connected to the 4a switch SW41, a first electrode of the second sampling capacitor CS2, and the 3a switch SW31. The third input reference voltage VREFI2=V2 is set to be the same as the non-touch voltage of the charge amplifier 10 in the falling period of the touch driving signal VM. The 3b switch SW32 is connected between the sixth node n6 and the second input reference voltage terminal. The reference voltage VREFI, which is the same as the reference voltage of the single-ended amplifier OP1, is supplied to the second input reference voltage terminal of the second sampling circuit SCC2. As shown in FIG. 8, the 3a and 3b switches SW31 and SW32 are turned on before the rising periods of the driving signal VM, to initialize the voltage of the second sampling capacitor CS2 to the third input reference voltage VREFI2=V2.

The 4a switch SW41 is connected between the first node n1 and the fifth node n5. The 4b switch SW42 is connected between the sixth node n6 and the fourth node n4. The sixth node n6 is connected to a second electrode of the second sampling capacitor CS2, the 3b switch SW32, and the 4b switch SW42. As shown in FIG. 8, the 4a and 4b switches SW41 and SW42 are simultaneously turned on before the falling period of the touch driving signal VM, to supply the input voltage VIN to the feedback capacitor CFBI through the second sampling capacitor CS2.

The voltage sampled in the falling period of the touch driving signal VM is VREFI2−VOUTP. If the output voltage VOUTP of the charge amplifier 10 occurring when there is no touch is V2, VREFI2−VOUTP=V2−V2=0. If there is a touch, VOUTP is different from VREFI2 and that difference will be sampled at the falling period of the touch driving signal VM.

FIG. 7 is a circuit diagram showing an example of application of the integrator 20 of this invention in an analog circuit for the sensing part 12 of FIG. 1, i.e., in a mutual capacitance type touch sensor. FIG. 8 is a waveform diagram showing input and output waveforms of the analog circuit of FIG. 7. The circuit and operation of the integrator 20 have been previously described in conjunction with FIG. 6, so a detailed description thereof will be omitted. If the touch sensors are implemented by the mutual capacitance CM shown in FIG. 1, the driving signal VM is supplied to the Tx electrodes connected to the mutual capacitance CM. In FIGS. 7 and 8, OP2 denotes the single-ended amplifier of the charge amplifier 10. SWRP is a reset switch for resetting the capacitor CFBP of the charge amplifier 10. CFBP is a feedback capacitor connected between an inverting input terminal of the signal-ended amplifier OP2 and an output terminal. SWRI is a reset switch for resetting the capacitor CFBI of the integrator 20. CFBI is a feedback capacitor connected between the inverting input terminal of the single-ended amplifier OP1 and the output terminal. In FIG. 8, α=Cs1/CFBI in the rising period of the touch driving signal VM, and α=Cs2/CFBI in the falling period of the touch driving signal VM. TSP denotes a touchscreen including the touch sensors. Touch IC denotes an IC (integrated circuit) in which the touch sensor driver 110 is integrated.

As shown in FIG. 8, the 2a and 2b switches SW21 and SW22 supply the input voltage VIN to the integrator 20 during time t1. The time t1 exists within the rising period of the driving signal VM. The 4a and 4b switches SW41 and SW42 supply the input voltage VIN to the integrator 20 during time t2 after the time t1. The time t2 exists within the falling period of the driving signal VM.

As shown in FIGS. 7 and 8, the charge amplifier 10 and the integrator 20 may be connected to the mutual capacitance CM. In this example, while there is no touch, the output voltage of the integrator is kept at the reference voltage (0V=GND) of the integrator. If touch input occurs, the output voltage VOUTP of the charge amplifier 10 increases to V1_t in the rising period of the driving signal VM and decreases to V2_t in the falling period of the driving signal VM, and the amount of change with respect to the non-touch voltages V1 and V2 is sampled by the capacitor CFBI of the integrator 20. The voltages V1_t and V2_t sampled during the rising period and the falling period of the driving signal VM contribute to output voltage VOUTI of the integrator in the same direction, i.e., in the same polarity. As such, as shown in FIG. 8, the output voltage VOUT1 of the integrator 20 increases within the output voltage range of 0V to VDD in both the rising and falling periods of the driving signal VM.

Figure 10:
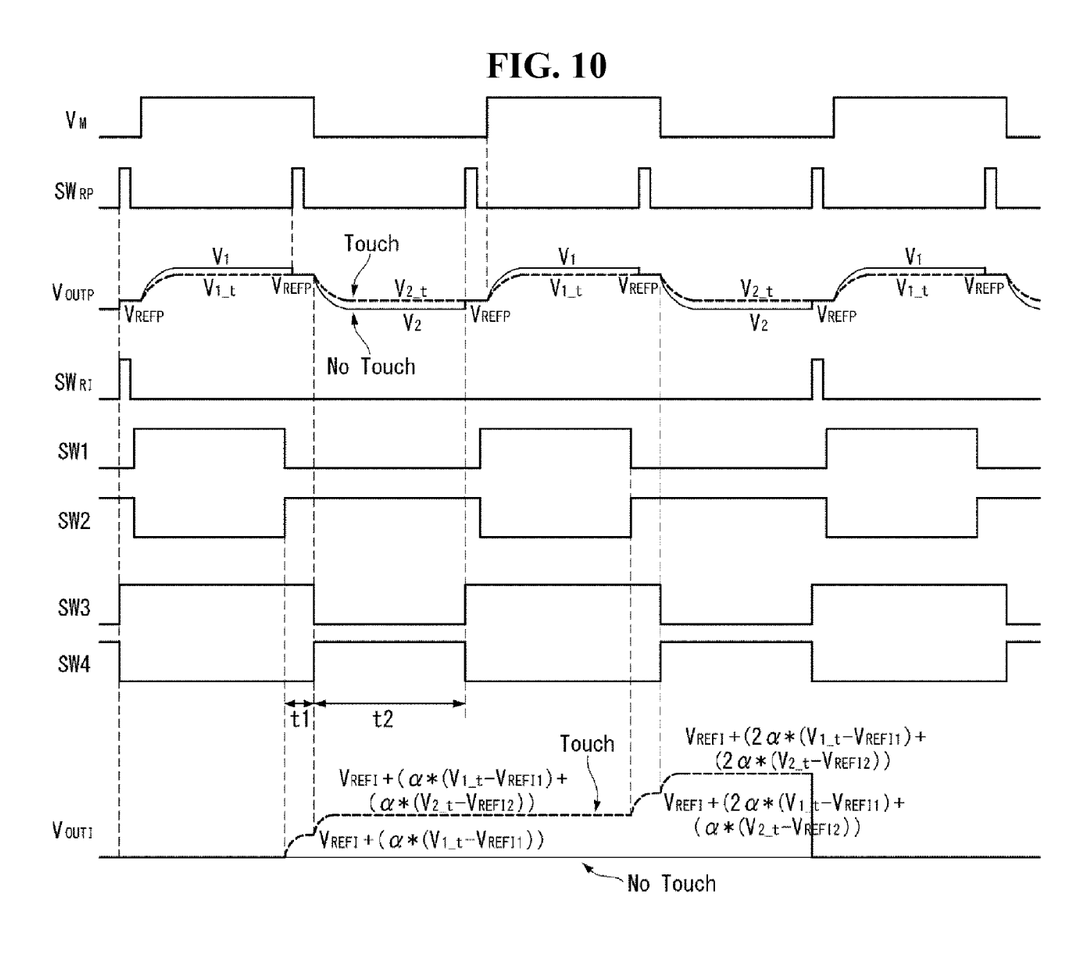
FIG. 10 is a waveform diagram showing input and output waveforms of the analog circuit of FIG. 9.

FIG. 9 is a circuit diagram showing an example of application of the integrator 20 of this invention in an analog circuit for the sensing part of FIG. 2, i.e., in a self-capacitance type touch screen (touch panel). FIG. 10 is a waveform diagram showing input and output waveforms of the analog circuit of FIG. 9. If the touch sensors are implemented by the self-capacitance Cs shown in FIG. 2, the driving signal VM is applied to the reference voltage terminal of the charge amplifier 10.

As shown in FIGS. 9 and 10, the charge amplifier 10 and the integrator 20 may be connected to the self-capacitance Cs of the touch sensor. In this example, while there is no touch, the output voltage of the integrator 20 is kept at the reference voltage (0V=GND) of the integrator 20. If touch input occurs, the output voltage VOUTP of the charge amplifier 10 decreases to V1_t in the rising period of the driving signal VM and increases to V2_t in the falling period of the driving signal VM, and the amount of change with respect to the non-touch voltages V1 and V2, respectively, is sampled by the capacitor CFBI of the integrator 20. The voltages V1_t and V2_t sampled during the rising period and the falling period of the driving signal VM contribute to output voltage VOUTI of the integrator in the same direction, i.e., in the same polarity. As such, the output voltage VOUT1 of the integrator 20 increases within the output voltage range of 0V to VDD.

As described above, the integrator of this invention integrates only the difference between a touch voltage and a non-touch voltage by setting the reference voltages VREFI1 and VREFI2 of the first and second sampling circuits SCC1 and SCC2, respectively, to be the same as the output voltage of the charge amplifier 10 occurring when there is no touch. Moreover, the integrator 20 can implement double sampling by the single-ended amplifier OP1 since the first sampling circuit SCC1 and the second sampling circuit SCC2 alternately sample an input voltage.

In the embodiments herein, the first and second sampling circuits are connected to an input terminal of the single-ended amplifier. The integrator allows for wider ranges of the reference voltage and output voltage of the single-ended amplifier and an increased number of integrations, and integrates only the difference between a touch voltage and a non-touch voltage by setting the reference voltages of the first and second sampling circuits to be the same as the output voltage of the charge amplifier occurring when there is no touch. Accordingly, the signal to noise ratio (SNR) of the touchscreen can be improved.

The integrator of the embodiments herein can implement double sampling by the single-ended amplifier since the first and second sampling circuits alternately sample an input voltage. Accordingly, the integrator of the embodiments herein provides a wider output voltage range and implements DI (delta integration) and DS (double sampling) without an increase in circuit area.

From the above description, those skilled in the art to which the present invention pertains will appreciate that various changes and modifications are possible without departing from the technical spirit of the present invention. Accordingly, the technical scope of this invention is not limited to what is described above, but rather defined by the appended claims.

What is claimed is:

1. A touch sense circuit comprising:
    a first sampling circuit to sample a touch sense signal during a first period of a touch drive signal in which the touch drive signal is at a first level, to generate a first sampled signal;
    a second sampling circuit to sample the touch sense signal during a second period of the touch drive signal in which the touch drive signal is at a second level, to generate a second sampled signal, the second sampling circuit configured to generate the second sampled signal in a same polarity as the first sampled signal; and
    an integrator including an input terminal and an output terminal, both the first sampled signal and the second sampled signal being input to the input terminal of the integrator and integrated to generate an output signal at the output terminal of the integrator, the output signal being used to detect a touch input.

2. The touch sense circuit of claim 1, wherein:
    the first sampled signal is indicative of a first difference between the touch sense signal and a first reference voltage, and
    the second sampled signal is indicative of a second difference between the touch sense signal and a second reference voltage.

3. The touch sense circuit of claim 2, wherein the first reference voltage and the second reference voltage are set to a value of the touch sense signal during the first period and the second period, respectively, of the touch drive signal when there is no touch.

4. The touch sense circuit of claim 1, wherein the touch sense signal is generated at touch electrodes of a touch panel in response to the touch drive signal.

5. The touch sense circuit of claim 4, wherein the touch sense signal is indicative of change in mutual capacitance of the touch electrodes responsive to the touch input.

6. The touch sense circuit of claim 5, further comprising a charge amplifier circuit to amplify a difference between a voltage at the mutual capacitance and a mutual touch reference voltage to generate the touch sense signal.

7. The touch sense circuit of claim 4, wherein the touch sense signal is indicative of change in self-capacitance of the touch electrodes responsive to the touch input.

8. The touch sense circuit of claim 7, further comprising a charge amplifier circuit to amplify a difference between a voltage at the self-capacitance and the touch drive signal to generate the touch sense signal.

9. The touch sense circuit of claim 1, wherein the first sampling circuit is connected in parallel to the second sampling circuit with reference to the input terminal of the integrator.

10. The touch sense circuit of claim 1, wherein the first sampling circuit comprises:
    a first switch connected between a first node and a second node;
    a second switch connected between the second node and a first input reference voltage terminal;
    a third switch connected between a third node and a second input reference voltage terminal;
    a fourth switch connected between the third node and a fourth node; and
    a first sampling capacitor connected between the second node and the third node,
    the first node being connected to the input terminal of the integrator,
    the second node being connected to the first switch, a first electrode of the first sampling capacitor, and the second switch,
    the third node being connected to a second electrode of the first sampling capacitor, the third switch, and the fourth switch, and
    the fourth node being connected to the fourth switch and an input terminal of a single-ended amplifier,
    wherein a first reference voltage same as a value of the touch sense signal during the first period of the touch drive signal when there is no touch is supplied to the first input reference voltage terminal, and
    wherein a reference voltage of the integrator is also supplied to the second input reference voltage terminal.

11. The touch sense circuit of claim 10,
    wherein the first switch and the third switch are simultaneously turned on before the first period of the touch drive signal, and
    wherein the second switch and the fourth switch are simultaneously turned on during the first period of the touch drive signal after the first switch and the second switch are turned off.

12. The touch sense circuit of claim 10, wherein the second sampling circuit comprises:
    a fifth switch connected between a fifth node and a third input reference voltage terminal;
    a sixth switch connected between a sixth node and the second input reference voltage terminal;
    a seventh switch connected between the first node and the fifth node;
    an eighth switch connected between the sixth node and the fourth node; and
    a second sampling capacitor connected between the fifth node and the sixth node, the fifth node being connected to the fifth switch, a first electrode of the second sampling capacitor, and the seventh switch, and the sixth node being connected to a second electrode of the second sampling capacitor, the sixth switch, and the eighth switch, wherein a second reference voltage same as a value of the touch sense signal during the second period of the touch drive signal when there is no touch is supplied to the second input reference voltage terminal.

13. The touch sense circuit of claim 12, wherein the fifth switch and the sixth switch are simultaneously turned on before the first period of the touch drive signal, and wherein the seventh switch and the eighth switch are simultaneously turned on during the second period of the touch drive signal after the fifth switch and the sixth switch are turned off.

14. A display device comprising:

a display drive circuit for driving input image data to pixels of a display panel; and a touch sense circuit to sense a touch input on a plurality of touch electrodes, the touch sense circuit comprising:

a first sampling circuit to sample a touch sense signal during a first period of a touch drive signal in which the touch drive signal driven to the touch electrodes is at a first level, to generate a first sampled signal;

a second sampling circuit to sample the touch sense signal during a second period of the touch drive signal in which the touch drive signal driven to the touch electrodes is at a second level, to generate a second sampled signal, the second sampling circuit configured to generate the second sampled signal in a same polarity as the first sampled signal; and an integrator including an input terminal and an output terminal, both the first sampled signal and the second sampled signal being input to the input terminal of the integrator and integrated to generate an output signal at the output terminal of the integrator, the output signal being used to detect the touch input.

15. The display device of claim 14, wherein:

the first sampled signal is indicative of a first difference between the touch sense signal and a first reference voltage, and the second sampled signal is indicative of a second difference between the touch sense signal and a second reference voltage.

16. The display device of claim 15, wherein the first reference voltage and the second reference voltage are set to a value of the touch sense signal during the first period and the second period, respectively, of the touch drive signal when there is no touch.

17. The display device of claim 14, wherein the touch sense signal is indicative of change in mutual capacitance of the touch electrodes responsive to the touch input.

18. The display device of claim 17, wherein the touch sense circuit further comprises a charge amplifier circuit to amplify a difference between a voltage at the mutual capacitance and a mutual touch reference voltage to generate the touch sense signal.

19. The display device of claim 14, wherein the touch sense signal is indicative of change in self-capacitance of the touch electrodes responsive to the touch input.

20. The display device of claim 19, wherein the touch sense circuit further comprises a charge amplifier circuit to amplify a difference between a voltage at the self-capacitance and the touch drive signal to generate the touch sense signal.

21. The display device of claim 14, wherein the first sampling circuit is connected in parallel to the second sampling circuit with reference to the input terminal of the integrator.

22. The display device of claim 14, wherein the first sampling circuit comprises:

a first switch connected between a first node and a second node;

a second switch connected between the second node and a first input reference voltage terminal;

a third switch connected between a third node and a second input reference voltage terminal;

a fourth switch connected between the third node and a fourth node; and a first sampling capacitor connected between the second node and the third node, the first node being connected to the input terminal of the integrator, the second node being connected to the first switch, a first electrode of the first sampling capacitor, and the second switch, the third node being connected to a second electrode of the first sampling capacitor, the third switch, and the fourth switch, and the fourth node being connected to the fourth switch and an input terminal of a single-ended amplifier, wherein a first reference voltage same as a value of the touch sense signal during the first period of the touch drive signal when there is no touch is supplied to the first input reference voltage terminal, and wherein a reference voltage of the integrator is also supplied to the second input reference voltage terminal.

23. The display device of claim 22, wherein the first switch and the third switch are simultaneously turned on before the first period of the touch drive signal, and wherein the second switch and the fourth switch are simultaneously turned on during the first period of the touch drive signal after the first switch and the second switch are turned off.

24. The display device of claim 22, wherein the second sampling circuit comprises:

a fifth switch connected between a fifth node and a third input reference voltage terminal;

a sixth switch connected between a sixth node and the second input reference voltage terminal;

a seventh switch connected between the first node and the fifth node;

an eighth switch connected between the sixth node and the fourth node; and a second sampling capacitor connected between the fifth node and the sixth node, the fifth node being connected to the fifth switch, a first electrode of the second sampling capacitor, and the seventh switch, and the sixth node being connected to a second electrode of the second sampling capacitor, the sixth switch, and the eighth switch, wherein a second reference voltage same as a value of the touch sense signal during the second period of the touch drive signal when there is no touch is supplied to the second input reference voltage terminal.

25. The display device of claim 24,
wherein the fifth switch and the sixth switch are simultaneously turned on before the first period of the touch drive signal, and
wherein the seventh switch and the eighth switch are simultaneously turned on during the second period of the touch drive signal after the fifth switch and the sixth switch are turned off.

26. A method for sensing a touch input on a touch panel including a plurality of touch electrodes, the method comprising:
sampling a touch sensor signal during a first period of a touch drive signal in which the touch drive signal is at a first level, to generate a first sampled signal;
sampling the touch sense signal during a second period of the touch drive signal in which the touch drive signal is at a second level, to generate a second sampled signal, the second sampled signal in a same polarity as the first sampled signal; and
integrating both the first sampled signal and the second sampled signal to generate an output signal, the output signal being used to detect a touch input.

27. The method of claim 26, wherein:
the first sampled signal is indicative of a first difference between the touch sense signal and a first reference voltage, and
the second sampled signal is indicative of a second difference between the touch sense signal and a second reference voltage.

28. The method of claim 27, wherein the first reference voltage and the second reference voltage are set to a value of the touch sense signal during the first period and the second period, respectively, of the touch drive signal when there is no touch.

29. The method of claim 26, wherein the touch sense signal is indicative of change in mutual capacitance of the touch electrodes responsive to the touch input.

30. The method of claim 26, wherein the touch sense signal is indicative of change in self-capacitance of the touch electrodes responsive to the touch input.

* * * * *